S. E. COUCH.
PORTABLE COUCH.
APPLICATION FILED AUG. 9, 1915.
1,227,586.
Patented May 29, 1917.
2 SHEETS—SHEET 1.
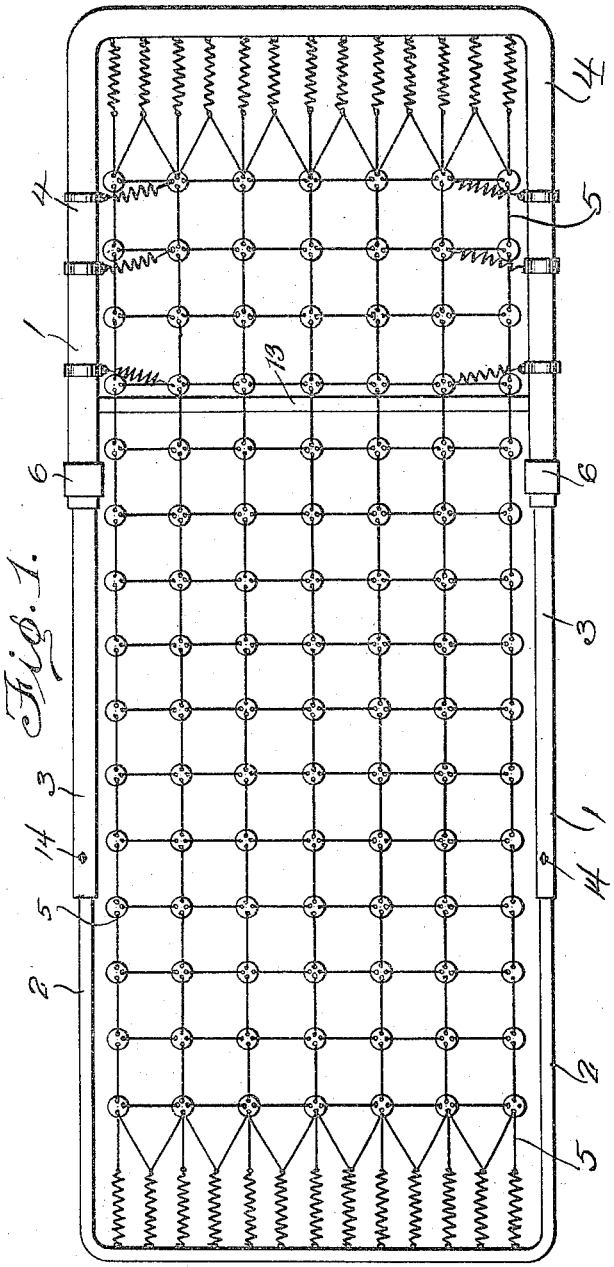
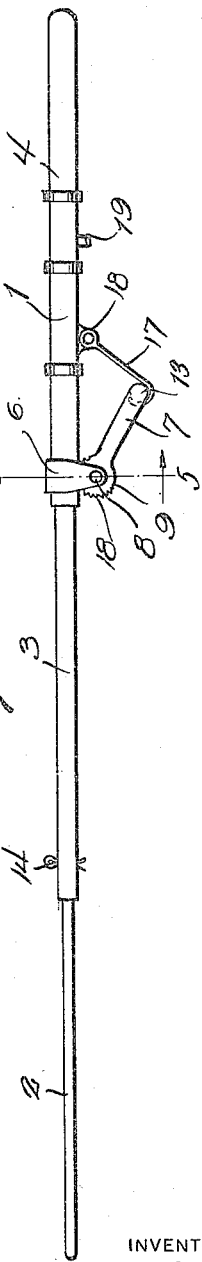
WITNESSES
INVENTOR
Silvester E. Couch
BY
ATTORNEY

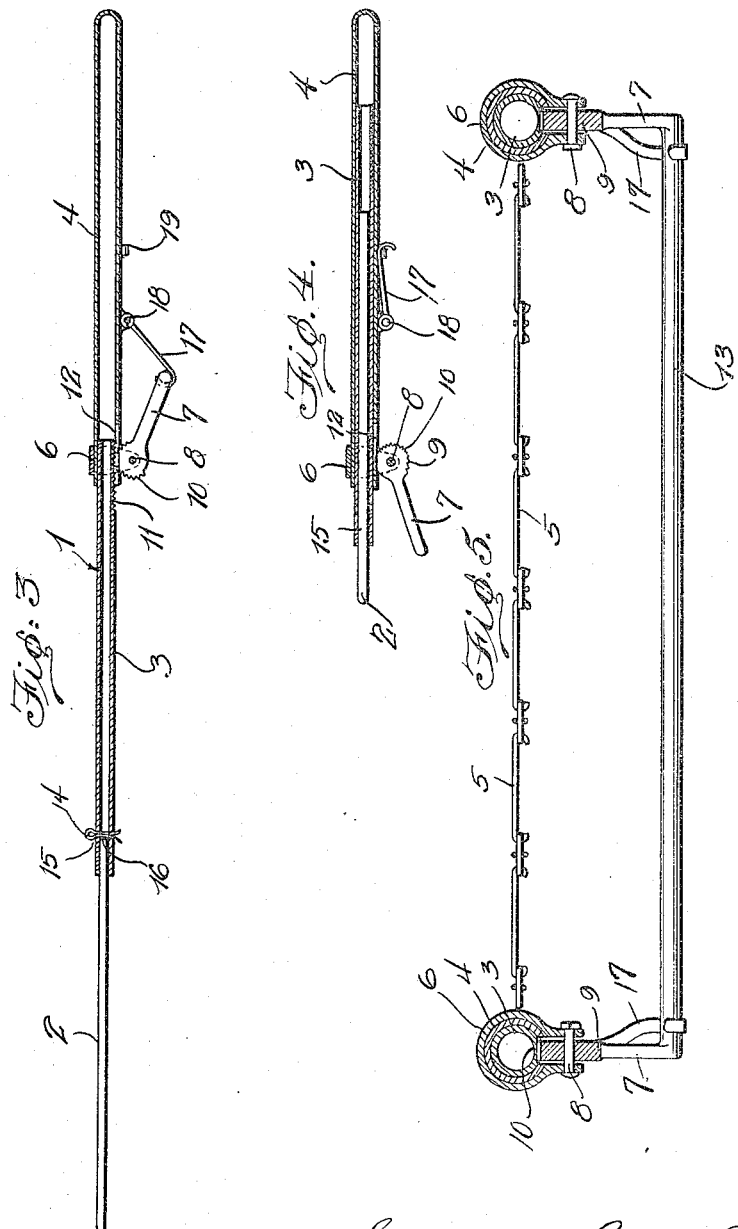

UNITED STATES PATENT OFFICE.

SILVESTER E. COUCH, OF CLEARWATER, FLORIDA.

PORTABLE COUCH.

1,227,586.	Specification of Letters Patent.	Patented May 29, 1917.

Application filed August 9, 1915. Serial No. 44,561.

*To all whom it may concern:*

Be it known that I, SILVESTER E. COUCH, a citizen of the United States, residing at Clearwater, in the county of Pinellas and State of Florida, have invented certain new and useful Improvements in Portable Couches, of which the following is a specification.

The present invention is designed as an improved conveniently portable couch or bed.

An object of the invention is to provide a collapsible or telescopic bed or couch particularly adapted for use as an automobile accessory whereby at night, or in emergency cases, one or more of the occupants of the automobile may sleep or lie at rest.

A further object of the invention is to provide an improved means whereby the telescopic frame sections of the bed or couch may be widely spread or separated and subsequently held in such position.

I further contemplate an improved means for supporting the bed or couch when extended.

The above and additional objects are accomplished by such means as are illustrated in their preferred embodiment in the accompanying drawings, described in the following specification and then more particularly pointed out in the claim which is appended hereto and forms a part of this application.

In describing my invention in detail reference will be had to the accompanying drawings wherein like characters denote like or corresponding parts throughout the several views, and in which:—

Figure 1 is a plan view of my improved portable bed or couch;

Fig. 2 is a side elevation;

Fig. 3 is a longitudinal sectional view of one of the longitudinal frame sides, extended;

Fig. 4 is a similar view, collapsed; and

Fig. 5 is an enlarged section on the line 5—5 of Fig. 2.

Before proceeding with a description of the drawings I desire to call particular attention to the fact that while I have evolved my invention with reference to its use as an automobile accessory, the same, if desired, may be used independently of an automobile and in any capacity desired.

Referring now to the drawings by numerals, 1 designates as an entirety the couch frame, the said frame in its preferred embodiment comprising a plurality of frame sections designated respectively 2, 3 and 4. The end sections, 2 and 4, are of a different construction from that of the intermediate section 3, each being of a substantially U-shape formation, the extensions forming with the intermediate section 3, the longitudinal sides of the frame and the connecting portions (of each end section) forming the ends of the mentioned frame.

Each frame section is constructed of hollow piping or tubing that the frame as an entirety may be telescoped. The intermediate section 3 telescopes within the outer section 4 and the end section 2 within the intermediate section 3 thus forming, when the frame is completely collapsed or telescoped, a bed or couch of a size approximately that of the end section 4.

A suitable spring 5 comprising intersecting wire strands is secured at its opposite ends to the connecting portion of each of the mentioned end frame sections 2 and 4.

A band or collar 6 is secured to each extension of the end section 4 adjacent the free terminals thereof, said band affording a support means for a lever 7 pivoted as at 8 and equipped with an enlarged end or head portion 9 in turn provided with teeth 10. The mentioned teeth are adapted to engage with teeth 11 formed upon the inner end of each of the two parts constituting the intermediate section 3. The said head portion 9 of the lever 7 is mounted to operate in a slot 12 of the end section 4 that the teeth 10 and the teeth 11 may intermesh.

The mentioned levers 7 are connected as indicated at 13 that they may be moved in unison to evenly and properly extend the intermediate section 3 in the manner desired. Through operation of the said lever 7, the tension of the spring 5 may be varied as desired.

As a means whereby the end section 2 may be locked extended relatively to the intermediate section 3, I provide suitable pins 14 (preferably of the cotter type) which are adapted to pass through alined openings 15 and 16 formed respectively in the intermediate section 3 and the end section 2.

A retaining element (hook-shaped) 17, pivoted as at 18 to each extension of the end frame section 4 is adapted for overlapping engagement with the connecting portion 13 of the lever 7, that the mentioned lever may be held against movement subsequent to manipulation and extension of the telescopic frame.

In use, and assuming that the bed or couch is folded, it is but necessary that the end frame section 2 be extended relatively to the intermediate section 3 and locked in its extended position through the medium of the pins 14. When thus extended, the intermediate section 3 is extended relatively to the end section 4 until the teeth 11 of the said intermediate section have been brought into contact or mesh with the teeth 10 of the enlargement 9 formed upon the lever 7. When thus in contact, the levers 7 are operated simultaneously by grasping the connecting portion 13 thereof and moving the said connecting portion toward the adjacent end of the couch frame or into a position whereby to be engaged by the hook elements 17. When thus fastened, the mentioned connecting portion may act as a support means for one end of the bed or couch.

A keeper 19 is fastened to the end section 9 in proximity to the hook element that the said element may be locked against turning movement when not in use.

From the foregoing, taken in connection with the accompanying drawings it is apparent that the couch may be extended manually or without the use of the levers 7 to a predetermined degree and subsequent to such extension, forcibly extended to a greater degree through manipulation of the mentioned levers; that the tension of the supporting spring 5 may be varied through manipulation of the levers 7; and that when collapsed, the entire bed or couch may be placed conveniently at the rear of, at one side of, or within the automobile in connection with which it is used to be transported from place to place.

When extended, the couch or bed may rest upon the top of the vehicle or automobile (providing the machine is of the two-seated type) to be thus supported in a substantially horizontal plane.

In reduction to practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as defined in the appended claim.

Having thus fully described my invention, what I claim as new and desire to secure by Letters Patent, is:—

A bed spring comprising a frame of longitudinally and relatively movable telescoping end sections and an intermediate section, the end sections being of substantially U-shaped formation, means on one of the end section terminals for locking engagement with one of the intermediate section terminals when said sections are extended, rack teeth formed on the other terminals of the intermediate section, toothed segments pivoted to the terminals of the other end section for meshing engagement with the rack teeth when the said sections are extended, levers formed on the segments, a bar connecting the ends of the levers for simultaneous movement, concatenate material within the frame and connected to the end sections by a plurality of resilient elements whereby when the bar is moved in one direction the end and intermediate sections are separated and the material placed under strain, and hooked elements for engaging the bar to retain the same in such position.

In testimony whereof I affix my signature in presence of two witnesses.

SILVESTER E. COUCH.

Witnesses:
W. N. REECE,
JAMES A. BROWN.

Copies of this patent may be obtained for five cents each, by addressing the "Commissioner of Patents, Washington, D. C."